United States Patent [19]

Inoue

[11] 4,447,695
[45] May 8, 1984

[54] INVERTER-TYPE POWER SUPPLY CIRCUIT FOR ELECTRICAL MACHINING

[75] Inventor: Kiyoshi Inoue, Tokyo, Japan

[73] Assignee: Inoue-Japax Research Incorporated, Yokohama, Japan

[21] Appl. No.: 254,300

[22] Filed: Apr. 15, 1981

[30] Foreign Application Priority Data

May 13, 1980 [JP] Japan .................................. 55-63716

[51] Int. Cl.³ .............................................. B23P 1/08
[52] U.S. Cl. ............................... 219/69 C; 219/69 P; 363/34; 363/37; 363/71
[58] Field of Search .................. 219/69 P, 69 C, 69 R, 219/69 M; 363/34, 37, 71, 124

[56] References Cited

U.S. PATENT DOCUMENTS

| | | | |
|---|---|---|---|
| 3,268,900 | 8/1966 | Hirata | 363/71 |
| 3,325,716 | 6/1967 | Gomi | 363/34 X |
| 3,360,683 | 12/1967 | Inoue | 219/69 P |
| 3,461,310 | 8/1969 | Pintell | 363/34 X |
| 3,596,038 | 7/1971 | Hockenberry | 219/69 P |
| 3,655,936 | 4/1972 | Saito et al. | 219/69 P |
| 4,017,705 | 4/1977 | Bazhenov et al. | 219/69 C |
| 4,151,388 | 4/1979 | Bell, Jr. et al. | 219/69 P |
| 4,222,098 | 9/1980 | Nagano | 363/71 |

Primary Examiner—M. H. Paschall
Attorney, Agent, or Firm—Karl F. Ross; Herbert Dubno

[57] ABSTRACT

An inverter-type power supply circuit for electrical machining comprising a plurality of AD-DC-HF-DC (PULSE) inverters jointly connected between a common source of commercial alternating current and a single electrical machining gap. A common pulsing means is provided for the individual switches in these plural inverter circuits for providing thereto in unison a succession of time-spaced groups (Ton, Toff) of elementary signal pulses to provide across said gap concurrent occurring channels of time-spaced groups (Ton, Toff) of elementary machining pulses ($\tau$on, $\tau$off) which channels are superimposed upon one another across the machining gap. The plural inverter circuits include individual high-frequency transformers each of which, or a portion of which, has a plurality of settings for transforming the original voltage to a desired output voltage level which settings are selectively established to selectively establish the desired voltage and current characteristics of the superimposed elementary machining pulses in time-spaced groups.

7 Claims, 3 Drawing Figures

INVERTER-TYPE POWER SUPPLY CIRCUIT FOR ELECTRICAL MACHINING

CROSS REFERENCE TO RELATED APPLICATION

This application is related to Ser. No. 911,947 filed June 2, 1978 and both commonly assigned and copending herewith.

FIELD OF THE INVENTION

The present invention relates to a power supply for electrical machining and, more particularly, to an inverter-type power supply which has particular utility in electrical discharge machining (EDM) and may also be used in electrochemical machining (ECM), electro-chemical-discharge machining (ECDM), high-speed electroplating, electro-spark deposition, arc welding and any other electrical machining process.

BACKGROUND OF THE INVENTION

In my copending U.S. patent application Ser. No. 911,947 filed June 2, 1978, there is disclosed and described an inverter-type power supply for electrical machining which basically comprises a transformerless input means connectable directly to a source of commercial alternating current, a rectifier connected to the input means directly for converting the commercial alternating current to a direct current, a high-frequency transformer having a primary winding connected via a high-frequency switch to the output of the rectifier and a secondary winding connected via a further rectifier to an electrical machining gap and a signal pulser for furnishing signal pulses to the switch. The latter is thus turned on and off at a high frequency with the signal pulses to provide a desired train of machining pulses across the gap. It has been pointed out that this inverter structure provides an improved power supply which is highly suitable for electrical machining and is reduced both in size and weight, is high in stability and efficiency and is practically trouble-free.

OBJECT OF THE INVENTION

It is an object of the present invention to provide a new, useful and improved power supply circuit for electrical machining which affords both extremely high machining efficiency and power transmission efficiency and which represents a substantial improvement over the prior system mentioned above.

Other objects will become apparent from the description which follows proceeds

SUMMARY OF THE INVENTION

In accordance with the present invention, there is provided a power supply circuit for electrical machining, which comprises:

a plurality of inverter circuits jointly connectable to a single electrical machining gap, each inverter circuit individually comprising: a transformerless input means connectable directly to a common source of commercial alternating current at a commercial supply frequency and with an original voltage; a rectifier means connected to the input means directly for converting the commercial alternating current to a direct current at the said original voltage; and a high-frequency transformer having a primary winding connected via a high-frequency switch means to the output of the rectifier means and a secondary winding connectable via a further rectifier to the single electrical machining gap; and a common pulsing means for said plural high-frequency switch means and for supplying thereto in unison a succession of time-spaced groups of elementary signal pulses and thereby pulsing each of the said direct currents at the respective outputs of the plural rectifier means to produce a succession of time-spaced groups of transformed elementary output pulses corresponding to the elementary signal pulses at the secondary winding of each of the plural high-frequency transformers and, in turn, to provide across the single machining gap, the plurality of concurrently occurring successions of time-spaced groups of unidirectional elementary machining pulses with each one of the successions corresponding to the succession of time-spaced groups of elementary signal pulses and with each group of the elementary machining pulses in one succession superimposed upon a group of the elementary machining pulses concurrently occurring therewith in another succession.

BRIEF DESCRIPTION OF THE DRAWING

The invention will become more readily apparent from the following description of preferred embodiments thereof as taken with reference to the accompanying drawing in which.

SPECIFIC DESCRIPTION

Figure 1:
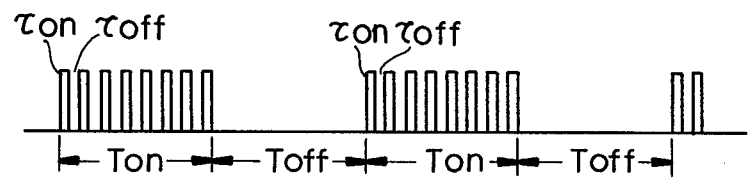
FIG. 1 is a wave-form diagram of a succession of time-spaced groups of elementary signal pulses as furnished from the pulsing means or of elementary output pulses which develop at the primary winding of each of the plural high-frequency transformers or of superimposed elementary machining pulses applied across the machining gap.

FIG. 1 shows a wave-form of a succession of time-spaced groups of elementary signal pulses as furnished from the pulsing means, or of elementary output pulses which develop at the primary winding of each of the plural high-frequency transformers or of superimposed elementary machining pulses applied across the machining gap, as will be described. The elementary pulses have each individually a pulse duration or on-time $\tau$on, say between 1 and 100 microseconds and between adjacent pulses a pulse interval or off-time $\tau$off, say between 1 and 50 microseconds. The groups of the elementary pulses have each dually a duration or on-time Ton, say between 10 microseconds and 10 milliseconds and between adjacent groups a time interval or off-time Toff, say between 10 microseconds and 10 milliseconds.

Figure 2:
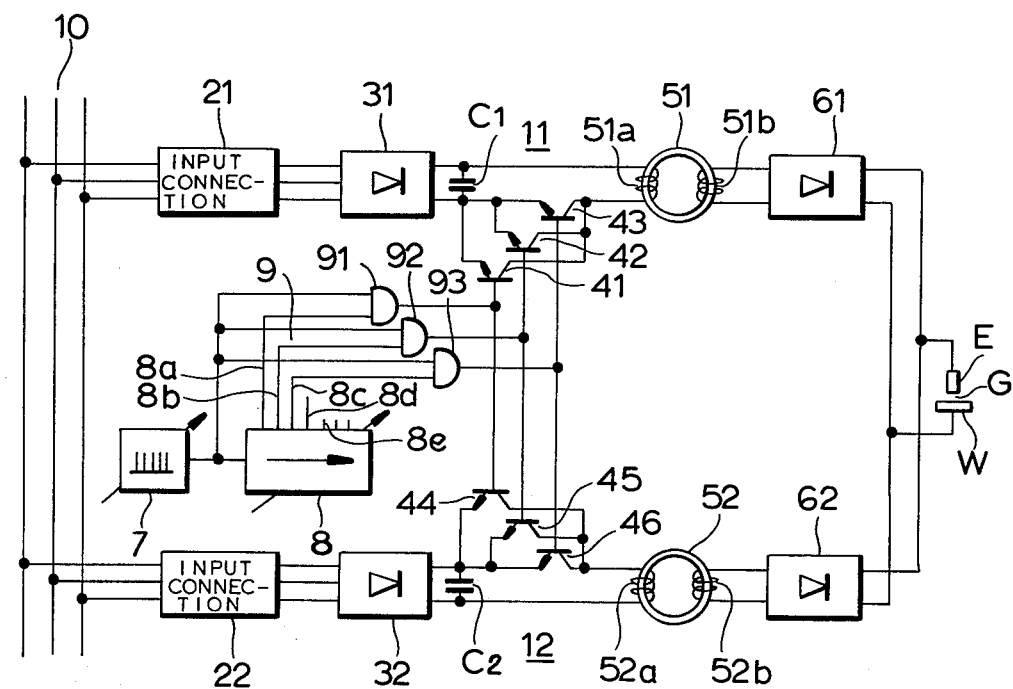
FIG. 2 is a circuit diagram of one embodiment of the invention utilizing two inverter circuits connected in parallel with each other to a source of commercial alternating current and to an EDM gap.

The power supply circuit shown in FIG. 2 is adapted to furnish the output power of a commercial alternating current source 10 via a pair of AC-DC-HF-DC pulse inverter circuits 11 and 12 to a single EDM gap G formed between a tool electrode E and a workpiece W.

The first inverter circuit 11 comprises a transformerless input terminal means 21 directly connected to the three-phase commercial AC source 10 of a commercial frequency and voltage. The input connection 21 may include a filter and is directly connected to a rectifier stage 31 which may include a smoothing capacitor $C_1$ for converting the commercial alternating current to a direct current at the original voltage of the source 10. The rectifier stage 31, which is preferably of full-wave rectification type, is connected via three power switch units 41, 42 and 43 connected in parallel with one another to the primary winding 51a of a high-frequency transformer 51. The latter has its secondary winding 51b which is connected via further rectifier stage 61 to the machining gap G.

The second inverter circuit 12 comprises a second transformerless input terminal means 22 directly connected to the three-phase commercial AC source 10. The input terminal means 22 may again include a filter and is directly connected to a second rectifier stage 32 which again includes a smoothing capacitor $C_2$ for converting the commercial alternating current to a direct current at the original voltage. The rectifier stage 32, which is again preferably of full-rectification type, is connected via three power switch units 44, 45 and 46 connected in parallel with one another to the primary winding 52a of a second high-frequency transformer 52. The latter has its secondary winding 52b connected via a second further rectifier stage 62 to the machining gap G.

The first and second further rectifier stages 61 and 62 are connected in parallel with one another to the tool electrode E and the workpiece W across the machining gap G. The latter is commonly flushed with a liquid machining medium, e.g. an aqueous liquid or hydrocarbon such as kerosene. Each of the power switch units 41, 42, 43, 44, 45 and 46 may be constituted by a single high-frequency switching power transistor, or a bank of such transistors.

An oscillator 7, e.g. a free-running multivibrator, provides a succession of elementary signal pulses having a duration or on-time $\tau$on and a pulse interval or off-time $\tau$off, which are fed to a pulsing circuit 8 constituted as a ring counter which defines a duration or on-time Ton and an interval or off-time Toff of time spaced groups of the elementary signal pulses. AND gates 91, 92 and 93 each combine the output of the oscillator 7 and an output of the ring counter 8 and respectively feed into the power switches 41 and 44; 42 and 45; and 43 and 46. The oscillator 7 and the ring counter 8 are variably adjusted to define the time parameters of the elementary signal pulses and hence the elementary machining pulses $\tau$on and $\tau$off and the time parameters of the duration Ton and interval Toff of the intermittently interrupted groups of the elementary signal pulses and hence the elementary machining pulses, depending upon a particular machining setting, viz. finishing, medium or roughing. The duration $\tau$on and interval $\tau$off should typically range respectively between 1 and 100 microseconds and between 1 and 50 microseconds. Each of the duration Ton and interval Toff should typically range between 10 microseconds and 10 milliseconds.

The ring counter 8 is of a multiple output type and has output terminals 8a, 8b, 8c, 8d, 8e . . . of which the first three may be used to energize the AND gate stage 9 comprising AND gates 91, 92 and 93. Each of these output terminals of the ring counter 8 provides a "1" output for a duration in which a preset number of output pulses incoming from the oscillator 7 is being counted thereby. For example, the output terminal 8a defines a time duration in which the first three elementary signal pulses in each group are counted; the output terminal 8b defines a time duration in which the fourth to sixth elementary signal pulses in the same group are counted; and the output terminal 8c defines a time duration in which the seventh and eighth elementary signal pulses are counted in the same group, the same of these durations defining the duration of each group Ton. The interval between the adjacent groups Toff is defined by the respective settings and the number of the remaining output terminals 8d, 8e, . . . . Thus, the switches 41 and 44 are rendered in unison conductive in response to the first to third elementary signal pulses in each group allowed to pass through the AND gate 91 whereby to pulse the DC output which develops at each of the respective outputs of the rectifier stages 31 and 32 to provide the first to third elementary output pulses in the group at each of the respective primary windings 51a and 52a of the high-frequency transformers 51 and 52. The switches 42 and 45 are thereafter likewise rendered in unison conductive in response to the fourth to sixth elementary signal pulses in each group allowed to pass through the AND gate 92 whereby to pulse the DC output at each of the respective outputs of the rectifier stages 31 and 32 to provide the fourth to sixth elementary output pulses in the group at each of the respective primary windings 51a and 52a of the high-frequency transformers 51 and 52. Thereafter, the switches 43 and 46 are likewise rendered conductive in unison in response to the seventh and eighth elementary signal pulses in each group allowed to pass through the AND gate 93 whereby to pulse the DC output at each of the respective outputs of the rectifier stages 31 and 32 to provide the seventh and eighth elementary output pulses in the group at each of the respective primary windings 51a and 52a of the high-frequency transformers 51 and 52.

Alternatively, the ring counter 8 may be adapted to provide at its successive output terminals 8a, 8b, 8c, 8d, 8e, . . . a "1" output each time the counter 8 counts each incoming elementary signal from the oscillator 7. The number of AND gates 91, 92, 93, . . . in the AND gate stage 9 and the same number of switches 41, 42, 43, . . . and 44, 45, 46, . . . in the respective inverters 11 and 12 are provided corresponding to the number of elementary pulses to be included in each group having a duration Ton. Each elementary signal pulse "1" directly transmitted from the oscillator 7 and each output "1" signal of the terminal 8a, 8b, 8c . . . are combined at each AND gate 91, 92, 93, . . . to provide a switching signal having a duration $\tau$on. A series of the switching signals having an interval $\tau$off are applied to the pairs of the switches 41, and 44, 42 and 45, 43 and 46, . . . in succession to provide the corresponding series of elementary output pulses at each of the primary windings 51a and 52a of the transformers 51 and 52. The number of the elementary output pulses included in each group produced in each of the inverters 11 and 12 is determined by the number of the output terminals connected to the AND gates which are provided in turn for each set of switches 41, 42, 43, . . . and 44, 45, 46, . . . in each inverter 11, 12. The time interval Toff between adjacent groups is determined by the number of idle output terminals provided for the ring counter 8 and the duration of each individual elementary signal pulse.

Thus, the common pulsing means constituted by the oscillator 7 and the ring counter 8 is provided for the two respective switching stages 41, 42 and 43; and 44, 45 and 46 in the two inverter circuits 11 and 12 and supplies thereto in unison a succession of time-spaced groups (Ton, Toff) of elementary signal pulses ($\tau$on, $\tau$off) and thereby pulses each of the direct currents at the respective two outputs of the rectifier stages 31 and 32 to produce a succession of time-spaced groups of elementary output pulses corresponding to the elementary signal pulses at the primary winding 51a, 52a of each of the high-frequency transformers 51 and 52.

Each of the transformers 51 and 52 then develops at its secondary winding 51b, 52b a succession of time-spaced groups (Ton, Toff) of the transformed outputs or elementary output pulses of AC nature of the high-frequency at which the elementary output pulses abovementioned are received at its primary winding 51a, 52a. Thus in each circuit 11, 12, a desired voltage magnitude is established first at this stage, viz. upon reconverting the input power into the AC output with the time parameters thereof adjusted ready for conversion into a desired succession of time-spaced groups (Ton, Toff) of elementary machining pulses ($\tau$on, $\tau$off). The latter is achieved in each circuit 11, 12 at the rectifier stage 61, 62 to reproduce essentially the time setting (Ton, Toff; $\tau$on, $\tau$off) introduced by the pulsing means 7, 8. With each rectifier stage 61, 62 constituted by a full-wave rectifier, the elementary machining pulses in each group which develop across the gap G have the same frequency $1/(\tau on + \tau off)$ and the same pulse interval $\tau$off as those of the elementary signal pulses set at the pulsing means. With each rectifier stage 61, 62 arranged as a half-wave rectifier, the elementary pulses in each group which develops across the gap G have half the frequency and twice the pulse interval of the elementary signal pulses set at the pulsing means (7, 8).

The rectifier stages 61 and 62 are connected in parallel with each other across the machining gap G to cause each of the elementary machining pulses ($\tau$on, $\tau$off) in each group (Ton) in the first circuit 11 and each of elementary machining pulses ($\tau$on, $\tau$off) in each group (Ton) in the second circuit 12 which concurrently develop at the transformers 51 and 52 to be superimposed upon one another. In addition, each of the transformers 51 and 52 has a plurality of selectable winding taps (not shown in FIG. 2) either on the primary or secondary side 51a, 52a, 51b, 52b or both and is thus capable of variably setting its voltage transformation ratio to enable the eventual gap voltage and current characteristics which result from the superimposition to be readily adjusted variably depending upon particular desired machining results, without causing a deviation in the time parameters (Ton, Toff; $\tau$on, $\tau$off) which are precision-set at the pulsing means in conjunction with the latter.

In each channel 11, 12 for transmitting the commercially available input power 10 to the machining gap G, advantageously only the transformer 51, 52 in the stage directly preceding to the load stage is required which transformer, for the reason that it carries quite small, and so high-frequency current, can be sufficiently small and enables the entire power supply circuit unit to be small in size and weight. Furthermore, no resistor which causes heat loss of the input power is used in each of the inverter circuits 11, 12 so that an extremely high power transmission efficiency is achieved.

Moreover, the switching of the DC output at an extremely high speed of response to a group of elementary signal pulses is achieved by arranging a plurality of power switch units 41, 42 and 43; 44, and 45 and 46 in parallel with one another and operating them in succession, thus enabling a corresponding group of elementary output pulses of an extremely short duration and interval to be readily provided without failure and with due precision. The respective outputs of the high-frequency transformers 51 and 52 are converted at the rectifier stages 61 and 62 into a first train of DC output pulses and a second train of DC output pulses, respectively, which are superimposed upon one another. One of the first and second trains may be of a high voltage adapted to break down the machining gap G and thereby to trigger each individual elementary machining discharge and the other may be of a low voltage adapted to allow the discharge current of a desired high amperage to be passed through the gap G following the gap breakdown. Thus, a highly efficient sharing of the discharge power is achieved with the result of an enhanced power efficiency and an ability to allow an extremely stabilized machining discharge to be repetitively created across the machining gap G.

A succession of time-spaced groups (Ton, Toff) of superimposed elementary machining pulses ($\tau$on, $\tau$off) furnished from the rectifier stages 61 and 62 across the machining gap G originate at a succession of elementary signal pulses ($\tau$on, $\tau$off) furnished by the oscillator 7 and grouped (Ton, Toff) by the ring counter 8. Each individual machining discharge results from an elementary machining pulse having a small duration $\tau$on and which, repetitively produced, gives rise to electroerosion with a high-quality surface finish. The pulse interval $\tau$off defined between successive elementary machining pulses is sufficiently short to allow a high rate of repetition of machining discharges and accordingly a high rate of material removal. Any tendency towards the development of an arc discharge due to a shortness of the pulse interval $\tau$off is effectively prevented by presence of the pulse interruption period Toff which follows each duration period Ton in which the elementary machining pulses occur. Since the system is thus practically free from arcing or short-circuiting, it allows material removal at an extremely high rate, with finer finish and high machining efficiency.

Any desired machining setting ranging from roughing to finishing can readily be established by setting the oscillator 7 and the ring counter 8 to provide a desired set of time parameters Ton, Toff, $\tau$on and $\tau$off and by setting the winding ratios of the transformers 51 and 52 to provide a desired pulse voltage. The power supply circuit thus lends itself to a variety of machining settings with ease, permitting a given machining work to be performed with stability and increased efficiency.

For example, the oscillator 7 may be adjusted to provide a series of elementary signal pulses having a pulse duration $\tau$on of 1 microsecond and a pulse interval $\tau$off of 2 microseconds. The ring counter 7 may be adjusted to provide a group duration Ton of 50 microseconds and a group interval Toff of 50 microseconds. When a succession of time-spaced groups of elementary signal pulses thus formed is applied to the switches 41, 42 and 43; 44, 45 and 46 to pulse the respective DC outputs at the initial rectifier stages 31 and 32 to produce the respective high-frequency outputs at the inputs to the transformers 51 and 52, then to transform the respective outputs into outputs of desired voltage levels, then to rectify the respective transformed outputs to concurrently produce a first succession of groups of DC elementary machining pulses and a second succession of groups of DC elementary machining pulses at the respective outputs of the further rectifier stages 61 and 62 and finally to superimpose each of these pulses in the first succession upon each of those pulses in the second succession to provide an eventual succession of group of elementary machining pulses across the machining gap G, the power transmission efficiency is double over that of the prior system which includes resistors in its power transmission circuit. When the transformer 51 is adjusted to provide 180 volts and 5 amperes and the transformer 52 is adjusted to provide 40 volts and 20 amperes, a total machining current of 25 amperes is obtained which is far greater than the available limit of 10 amperes with the conventional resistor-type power supply circuit. It is seen therefore that a removal rate 2.5 times greater than that with the conventional system is achieved with the system according to the invention. When the transformer 51 is adjusted to provide 180 volts and 5 amperes and the transformer 52 is adjusted to provide 60 volts and 15 amperes, the total machining current becomes 20 amperes. The machining current efficiency is altered depending upon the settings of transformation ratios at the transformers 51 and 52 and the settings of time parameters at the oscillator 7 and the ring counter 8.

It should be understood that more than two inverter channels 11 and 12 may be connected or should be considered to be connected in parallel with one another between the AC input 10 and the machining gap G in the embodiment of FIG. 2. A desired number of plural parallel inverter circuits 11, 12 . . . may be selectively connected depending upon a particular mode of EDM operation to be performed.

Figure 3:
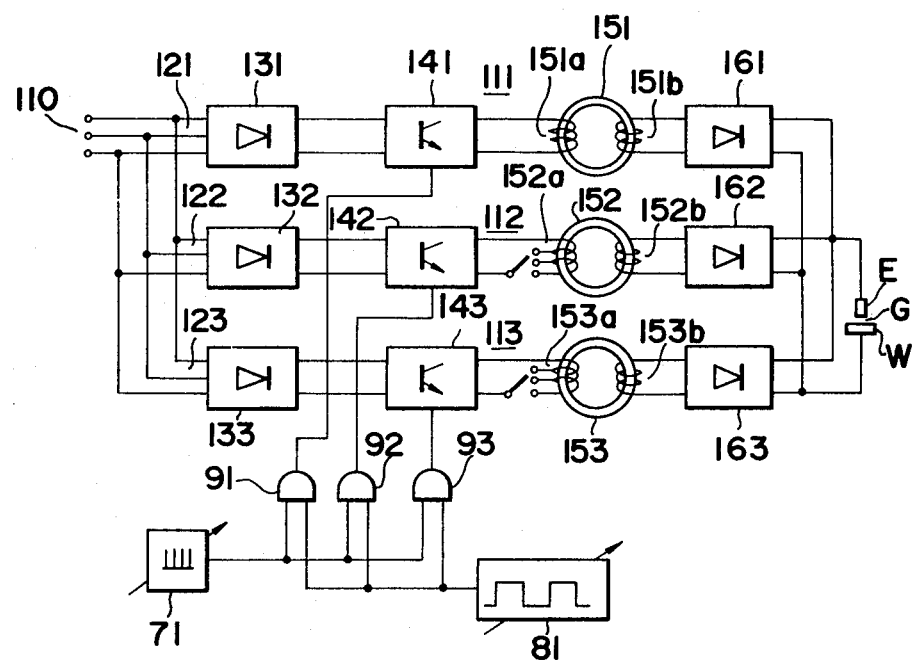
FIG. 3 is a circuit diagram of another embodiment of the invention comprising three parallel inverter circuits connected between the commercial AC source and the EDM gap.

FIG. 3 shows three inverter channels 111, 112 and 113 connected in parallel with one another between the AC input 110 and an EDM gap G formed between a tool electrode E and a workpiece W. As in the previous embodiment, each inverter channel 111, 112, 113 comprises an initial rectifier stage 131, 132, 133, a power switch 141, 142, 143, a high-frequency transformer 151, 152, 153, and a further rectifier stage 161, 162 163. In this embodiment, the common pulsing means for the switches 141, 142 and 143 is constituted by a first oscillator 71 and a second oscillator 81 whose respective outputs are combined at each of AND gates 91, 92 and 93 feeding into the power switches 141, 142 and 143. The first oscillator 71 provides a train of elementary signal pulses having a pulse duration or on-time $\tau$on and a pulse interval or off-time $\tau$off both of which are adjustable as desired in their respective given ranges as mentioned earlier. The second oscillator 81 provides a train of group pulses or pulses having a greater pulse duration Ton and a greater pulse interval Toff, both of which are adjustable as desired in their respective given ranges as mentioned earlier. Since the outputs of these first and second oscillators 71 and 81 are combined at each of AND gates 91, 92 and 93, a succession of time-spaced groups (Ton, Toff) of elementary signal pulses are furnished from each output of these AND gates to each of the power switches 141, 142 and 143 to provide a corresponding succession of time-spaced groups of elementary output pulses at each of the primary windings 151a, 152a and 153a of the high-frequency transformers 151, 152 and 153.

In this embodiment, the transformer 151 is shown as fixed in its transformation or winding ratio and the transformers 152 and 153 are shown as each having a plurality of settings of the transformation ratio in its primary winding but possibly alternatively or additionally in its secondary winding to enable the output voltage of each transformer to be adjustable as desired.

For example, the transformer 151 is adjusted to provide an output voltage of 180 volts, the transformer 152 is constructed to selectively provide output voltages of 180, 100, 70 and 40 volts and the transformer 153 is constructed to selectively provide output voltages of 100, 70 and 40 volts. When the transformer 151 is adjusted to provide an output of 180 volts and 0.8 ampere, the transformer 152 an output of 70 volts and 2 amperes and the transformer 153 an output of 40 volts and 3.5 amperes, a total machining current of 6.3 amperes is applied to the single machining gap G and allows a removal rate of 0.14 gram/min. The input AC power at the three-phase terminals 110 is then 0.42 kW. It is seen that this provides an extremely high power efficiency compared with the conventional resistor type power supply circuit from which the available power is limited to 1.2 kW. Elementary signal, output or machining pulses may have a pulse duration or on-time $\tau$on of 1 microsecond and a pulse interval $\tau$off of 2 microseconds, and a succession of time-spaced groups of these pulses may have a group duration or on-time Ton and a group interval or off-time Toff each of 50 microseconds. Then an EDM machining operation yields a surface roughness of 5 microns Rmax.

There is thus provided, in accordance with the present invention, an improved power supply circuit for electrical machining, which is small-sized and compact, yet allowing desired machining pulses to be produced with ease and furnished to an electrical machining gap with due precision. An extremely high-speed of response to a high-frequency switching signal is assured. A highly efficient power supply with higher and lower voltages which are superimposed upon one another is provided. The power supply circuit is thus excellent in its response characteristics, the operating stability, discharge-initiation characteristics, and in its power transmission and machining current efficiencies.

What is claimed is:

1. A power supply circuit for electrical machining, comprising:

a plurality of inverter circuits connectable in parallel with one another to have their respective input sides connected jointly to a common source of commercial alternating current and their respective output sides connected jointly to a single electrical machining gap, each of said parallel inverter circuits individually comprising:

a transformerless input means connectable directly to said common source of alternating current of a commercial supply frequency and an original voltage, a rectifier means connected to said input means directly for converting said commercial alternating current to a direct current at said original voltage, and a high-frequency transformer having a primary winding connected via a high-frequency switch means to the output of said rectifier means and a secondary winding connectable via further rectifier means to said single electrical machining gap;

a common pulsing means for said plurality of the high-frequency switch means and for supplying thereto in unison a succession of signal pulses and thereby pulsing each of said direct currents at the respective outputs of said plural rectifier means to provide a succession of transformed alternating output pulses of a desired voltage level and with time parameters corresponding to said succession of signal pulses at each of said plural high-frequency transformers and, in turn, to provide at the respective outputs of said plural further rectifiers a concurrently occurring plurality of trains of unidirectional machining pulses with each machining pulse having said desired voltage level and with successive machining pulses corresponding in time parameters to successive signal pulses and eventually to superimpose said machining pulses at the outputs of said plural further rectifier means upon one another to provide a succession of superimposed machining pulses and for applying said succession of the superimposed machining pulses across said single electrical machining gap, at least one of said high-frequency transformers having a plurality of settings of the ratio of transforming said original voltage to said desired voltage level, which settings are capable of selectively establishing the voltage and current characteristics of said superimposed machining pulses.

2. A power supply circuit for electrical machining, comprising:

a plurality of inverter circuits connectable in parallel with one another to have their respective input sides connected jointly to a common source of commercial alternating current and their respective output sides connected jointly to a single electrical machining gap, each of said parallel inverter circuits individually comprising:

a transformerless input means connectable directly to said common source of alternating current of a commercial supply frequency and an original voltage, a rectifier means connected to said input means directly for converting said commercial alternating current to a direct current at said original voltage, and a high-frequency transformer having a primary winding connected via a high-frequency switch means to the output of said rectifier means and a secondary winding connectable via further rectifier means to said single electrical machining gap;

a common pulsing means for said plurality of the high-frequency switch means and for supplying thereto in unison a succession of signal pulses and thereby pulsing each of said direct currents at the respective outputs of said plural rectifier means to produce a succession of transformed alternating output pulses of a desired voltage level and with time parameters corresponding to said succession of signal pulses at each of said plural high-frequency transformers and, in turn, to provide at the respective outputs of said plural further rectifiers a concurrently occurring plurality of trains of unidirectional machining pulses with each machining pulse having said desired voltage level and with successive machining pulses corresponding in time parameters to successive signal pulses and eventually to superimpose said machining pulses at the outputs of said plural further rectifier means upon one another to provide a succession of superimposed machining pulses and for applying said succession of the superimposed machining pulses across said single electrical machining gap, at least two of said high-frequency transformers having different ratios of transforming said voltage to said desired voltage level so that said concurrently occurring machining pulses at the outputs of the respective further rectifiers connected to said at least two high-frequency transformers have different voltage levels to be superimposed upon one another to provide desired voltage and current characteristics of said superimposed machining pulses across said single electrical machining gap.

3. The power supply circuit defined in claim 1 or 2 wherein said each input means includes a filter.

4. The power supply circuit defined in claim 1 or claim 2 wherein said each first-mentioned rectifier means includes a capacitor for smoothing said direct current.

5. The power supply circuit defined in claim 1 or claim 2 wherein said each further rectifier means comprise a full-wave rectifier.

6. The power supply circuit defined in claim 1 or claim 2 wherein said each further rectifier means comprise a half-wave rectifier.

7. The power supply circuit defined in claim 1 or claim 2 wherein said pulsing means comprises an oscillator for providing a series of said signal pulses, a ring counter connected to said oscillator for counting said signal pulses and having a plurality of output terminals adapted to provide a turn-on signal to said switch means upon said ring counter counting a preset number of said signal pulses and adapted and positioned in said ring counter to define the duration and time interval of said signal pulses.

* * * * *